United States Patent Office
2,719,165
Patented Sept. 27, 1955

2,719,165

TRIORGANOSILYLMETHYL SULFUR DERIVATIVES

Glenn D. Cooper, Schenectady, N. Y., assignor to General Electric Company, a corporation of New York No Drawing. Application April 15, 1953, Serial No. 349,099

7 Claims. (Cl. 260—448.2)

This invention is concerned with certain triorganosilylmethyl sulfur derivatives, and in particular relates to chemical compositions corresponding to the general formula $$R'_3Si—CH_2—S—R$$

where R is a member selected from the class consisting of hydrogen, the —CN radical, alkyl radicals (for instance, methyl, ethyl, propyl, butyl, isobutyl, hexyl, decyl, dodecyl, etc., radicals) and the —CH$_2$Si(R')$_3$ radical [e. g., the —CH$_2$Si(CH$_3$)$_3$ radical], and R' is a monovalent hydrocarbon selected from the class consisting of alkyl, aryl, alkaryl, and aralkyl radicals, including the alkyl radicals described above for R and, in addition, aryl radicals, e. g., phenyl biphenyl, naphthyl, etc., radicals; aralkyl radicals, e. g., benzyl, phenylethyl, etc., radicals; alkaryl radicals, e. g., tolyl, xylyl, etc., radicals. The R' or R radicals may be all alike, or, if desired, may be different. Preferably R and R' are methyl radicals.

These compounds may be prepared in various ways. One method for preparing some of these compounds where R and R' are monovalent hydrocarbon radicals comprises effecting reaction between a trihydrocarbon-substituted chloromethylsilane, e. g., trimethylchloromethylsilane, and sodium mercaptides having organic groups attached thereto and having the formula RSNa where R has the meaning given above. This is advantageously accomplished by dissolving chloromethyltrihydrocarbon-substituted silane in a solvent such as ethanol, adding a small amount of an alkali-metal hydroxide, for instance, sodium hydroxide, and thereafter adding a mercaptan, such as one having the formula RSH where R has the meaning given above. Under such conditions, particularly in the presence of water, the sodium mercaptide is formed and this in turn will react with the chloromethyltrihydrocarbon-substituted silane, for instance, chloromethyltrimethylsilane. It is usually helpful to heat the mixture at the reflux temperature of the mass for times ranging from about 2 to 8 hours or more to complete the reaction, and thereafter cooling it, adding water to effect separation of the organic layer, separating the latter layer and washing it with a strong caustic solution, and then with water and drying it and thereafter fractionally distilling the mass to obtain the desired trimethylsilylmethylsulfide. Methods for preparing the other described compounds will be apparent from the examples which follow.

In order that those skilled in the art may better understand how the present invention may be practiced, the following examples are given by way of illustration and not by way of limitation. All parts are by weight.

Example 1

About 24.4 grams chloromethyltrimethylsilane were dissolved in 50 ml. of 95% ethanol. Thereafter, 8 grams sodium hydroxide and 22 grams thiophenol were dissolved in 80 ml. water. The aqueous solution was added dropwise with stirring to the alcoholic solution. After the addition was completed, the mixture, which was now in two phases, was heated at the reflux temperature of the mass for about four hours. The mixture of ingredients was thereafter cooled and 300 ml. water added. The organic layer was separated, washed with 10% sodium hydroxide solution, and then further washed with water and dried over anhydrous calcium chloride. Distillation of the organic layer thus isolated yielded 26 grams (about 67% of theoretical yield) of trimethylsilylmethylphenylsulfide having the formula $$(CH_3)_3Si—CH_2—S—C_6H_5$$

boiling at about 158.5° C. at 52 mm. The material had a refractive index of $n_D^{20}$ 1.5380. Analysis of the compound showed it to contain 61.5% carbon, 8.5% hydrogen and 16.4% sulfur (theoretical 61.3% carbon, 8.2% hydrogen and 16.3% sulfur).

Example 2

In this example, 24.4 grams chloromethyltrimethylsilane were added in one portion to a hot solution of 0.2 mol of sodium methyl mercaptide in 100 ml. absolute ethyl alcohol. After the initial vigorous reaction took place with the formation of a fine white precipitate of sodium chloride, the mixture was further stirred and heated at the reflux temperature of the mass for one hour. The mixture was thereafter cooled and 500 ml. water added, the organic layer drawn off, washed with water and dried over anhydrous calcium chloride. Fractional distillation of this latter material yielded 18 grams (67% of theoretical yield) of trimethylsilylmethyl methyl sulfide having the formula $$(CH_3)_3Si—CH_2S—CH_3$$

boiling at 70° C. at 93 mm. This material had a refractive index of $n_D^{20}$ 1.4509. Analysis of this compound showed it to contain 45.4% carbon, 10.8% hydrogen and 24.1% sulfur (theoretical 44.9% carbon, 10.4% hydrogen, and 23.9% sulfur).

Example 3

This example illustrates the preparation of trimethylsilylmethylthiocyanate having the formula $$(CH_3)_3Si—CH_2—S—CN$$

More particularly, 48.8 grams trimethylchloromethylsilane and 32.4 grams sodium thiocyanate were added to 100 ml. 95% ethanol, and the mixture heated at reflux for 3 hours. The mixture was cooled and the precipitate was filtered off. Most of the alcohol was distilled and the residue was shaken with water and the organic phase removed, dried over anhydrous calcium chloride, and thereafter fractionally distilled to give the desired compound boiling at 196–197° C. at atmospheric pressure. This material had a refractive index $n_D^{20}$ 1.4676. Analysis of this compound showed it to contain 41.2% carbon, 8.7% hydrogen, and 9.7% nitrogen (theoretical 41.4% carbon, 7.6% hydrogen and 9.7% nitrogen).

Example 4

In this example, a solution of 36.6 grams of chloromethyltrimethylsilane in 100 ml. 95% ethyl alcohol was refluxed with stirring for two hours with 36 grams of sodium sulfide nonahydrate. The mixture was cooled and 500 ml. water added. The organic layer thus obtained as a separate phase was drawn off, washed with water and dried over anhydrous calcium chloride. Distillation of this material yielded 22 grams (71% of theoretical yield) of the compound having the formula $$(CH_3)_3SiCH_2S—CH_2—Si(CH_3)_3$$

boiling at 129° C. at 95 mm. This material had a refractive index $n_D^{20}$ 1.4570. Analysis showed the compound to contain 46.8% carbon, 10.9% hydrogen, and 15.8% sulfur (theoretical 46.6% carbon, 10.7% hydrogen and 15.5% sulfur).

*Example 5*

In this example, 16.8 grams potassium hydroxide were dissolved in 125 ml. absolute ethyl alcohol. The solution was saturated with hydrogen sulfide and thereafter refluxed and stirred while 24.5 grams chloromethyltrimethylsilane were added over a period of ten minutes; a stream of hydrogen sulfide was passed through the mixture during the addition in order to minimize sulfide formation. A white precipitate of potassium chloride was rapidly formed. Stirring and refluxing were continued for 30 minutes. The mixture was then cooled and 700 ml. water added. The upper organic layer was drawn off, washed with water, and dried over anhydrous sodium sulfate. Upon fractional distillation there was obtained in about a 42% yield trimethylsilylmethyl mercaptan having the formula $$(CH_3)_3SiCH_2SH$$

boiling at 55° C. at 93 mm. This material had a refractive index $n_D^{20}$ 1.4502. Analysis of this compound showed it to contain 40.1% carbon, 10.2% hydrogen and 26.6% sulfur (theoretical 40.0% carbon, 10.0% hydrogen and 26.7% sulfur).

It will, of course, be apparent to those skilled in the art that instead of making the trimethylsilylmethyl sulfide derivatives described above, one can also prepare other trihydrocarbon-substituted chloromethylsilanes, e. g., triphenyl chloromethyl silane, triethyl chloromethyl silane, methyldiphenyl chloromethyl silane, etc. In addition, instead of using the sodium methyl mercaptide one can employ other sodium mercaptides of the formula NaSR where R has the meaning given above, in addition to being the methyl group. Thus, one may employ sodium ethyl mercaptide, sodium propyl mercaptide, etc.

The compositions herein described can be employed as additives for petroleum oils or organopolysiloxane lubricants in order to improve their extreme pressure lubricity characteristics, as hydraulic fluids, as antioxidants for lubricating oils, etc. In addition, they can also be used as intermediates in the preparation of other chemical compounds. Thus, many of the compounds herein described can be oxygenated to give sulfones which can be employed as heat transfer media and which are stable at high temperatures. The following examples illustrate the preparation of some of these sulfones.

*Example 6*

To a solution of 5.15 grams of the bis-(trimethylsilylmethyl) sulfide prepared above and 25 ml. glacial acetic acid were added 11 ml. 30 per cent hydrogen peroxide. The solution become warm and was thereafter cooled in an ice bath for a few minutes and then allowed to stand at room temperature for about 15 hours. About 75 ml. water were thereafter added and the mixture shaken to give an oily phase which was drawn off and dissolved in pentane. The pentane solution was washed with water and dried over anhydrous calcium chloride. Evaporation of the pentane left a white solid which was twice recrystallized from pentane at −80° C. to yield the sulfone derivative having the formula $$(CH_3)_3SiCH_2SO_2CH_2Si(CH_3)_3$$

in the form of colorless needles melting at 47–48° C. This compound was identified as the desired sulfone composition as evidenced by the fact that analysis thereof showed it to contain 40.5% carbon, 9.2% hydrogen and 13.1% sulfur (theoretical 40.3% carbon, 9.3% hydrogen and 13.4% sulfur).

*Example 7*

A solution of 57 grams of the trimethylsilylmethyl methyl sulfide (prepared as in Example 2) in 200 ml. acetic acid was placed in a flask equipped with a reflux condenser and an ice bath. 125 ml. 30 per cent hydrogen peroxide were added in small portions through the top of the condenser. When the initial vigorous reaction had ceased, the mixture was allowed to stand at room temperature for about 15 hours after which 700 ml. water were added and the mixture concentrated under vacuum to about 200 ml. and thereafter cooled below room temperature to give a product in the form of colorless needles. Recrystallization of this mass from a benzene-hexane mixture gave again colorless needles melting at 78–79° C. identified as the sulfone of the starting trimethylsilylmethyl methyl sulfide having the formula $$(CH_3)_3SiCH_2SO_2CH_3$$

*Example 8*

In this example 9.8 grams of the trimethylsilyl methylphenyl sulfide prepared in Example 1 were added to a solution of 0.108 mol perphthalic acid in 200 ml. diethyl ether. The mixture was allowed to stand for about 120 hours after which the mixture was filtered and the filtrate evaporated almost to dryness. 100 ml. benzene were added to the dried product and the precipitate of phthalic acid which formed was filtered off and the benzene solution evaporated to leave a yellow liquid residue which, upon fractional distillation under reduced pressure, yielded the desired sulfone having the formula $$(CH_3)_3SiCH_2SO_2C_6H_5$$

boiling at 160° C. at 6 mm. and having a refractive index of $n_D^{20}$ 1.5250. Evidence that the sulfone had been obtained was established by means of analysis of the compound which showed it to contain 52.2% carbon, 7.1% hydrogen and 13.9% sulfur (theoretical 52.6% carbon, 7.0% hydrogen and 14.0% sulfur).

Employing the above-mentioned trihydrocarbon-substituted chloromethylsilanes, I am also able to obtain other derivatives therefrom as evidenced by the following examples:

*Example 9*

A mixture of 12.2 grams trimethylchloromethylsilane and 7.6 grams thiourea was heated at the reflux temperature of the mixture for about 4 hours with 20 ml. n-butanol. On cooling, there were obtained 10 grams of colorless crystals which, when recrystallized from dioxane, showed a melting point of 141.5–143° C. Analysis of this compound showed it to contain 30.3% carbon, 8.4% hydrogen and 14.5% nitrogen (theoretical 30.3% carbon, 7.6% hydrogen and 14.2% nitrogen) proving the compound to have the formula

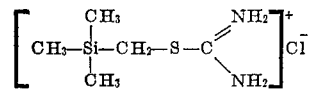

*Example 10*

About 14.5 grams methyl iodide were mixed with 7 grams trimethylsilylmethyl methyl sulfide and allowed to stand at room temperature in the dark for about 15 hours. The crystalline mass which was thus formed was filtered and washed several times with pentane to give about 13.9 grams (about 96% of the theoretical yield) of the compound $$(CH_3)_3SiCH_2\overset{+}{S}(CH_3)_2I^-$$

in the form of slightly yellow crystals which were very soluble in water and which melted sharply with decomposition at 106° C. Evidence that this compound was obtained was substantiated by the fact that analysis thereof showed it to contain 26.2% carbon, 6.1% hydrogen and 11.3% sulfur (theoretical 26.1% carbon, 6.1% hydrogen and 11.6% sulfur).

Employing the techniques described above using the monomeric trihydrocarbon-substituted chloromethylsilanes, I am also able to prepare similar derivatives by employing in place of these monomeric silanes, organopolysiloxanes containing silicon-bonded chloromethyl radicals. The remaining valences of silicon in these organopolysiloxanes, other than the valences in the siloxane linkages, are satisfied by alkyl radicals, preferably methyl radicals. Thus, it is possible to effect reaction between such compounds as, for instance, pentamethylchloromethyl disiloxane, heptamethylchloromethyl cyclotetrasiloxane with various mercaptides such as, for instance, those having the formula NaSR where R is a monovalent hydrocarbon radical, for instance, sodium methyl mercaptide, sodium phenyl mercaptide, as well as sodium thiocyanate and sodium hydrosulfide, to make the corresponding sulfur derivative of the polysiloxanes, e. g., pentamethyl disiloxanylmethyl thiocyanate, heptamethylcyclotetrasiloxanylmethyl thiocyanate, pentamethyl disiloxanylmethyl mercaptan, methyl (heptamethyl cyclotetrasiloxanylmethyl) sulfide, etc. These latter polysiloxane sulfur compositions containing a silicon-bonded —CH$_2$—S—R group where R has the meaning given above, can be employed as lubricating fluids, and may also find use as additives for lubricating materials in order to improve their lubricity characteristics. In addition, these polysiloxane sulfur derivatives can be used in the making of organopolysiloxane lubricating oils or organopolysiloxane elastomers whereby the former can be intercondensed with other organopolysiloxanes free of the sulfur atom to impart thereto improved lubricity, in the case of lubricating oils, and improved solvent resistance in the case of silicone elastomers.

What I claim as new and desire to secure by Letters Patent of the United States is:

1. A composition of matter corresponding to the general formula

R'$_3$Si—CH$_2$—S—R where R is a member selected from the class consisting of hydrogen, the cyano radical, alkyl radicals, and the trihydrocarbon-substituted silylmethyl radical having the formula —CH$_2$SiR'$_3$ where R' is a monovalent hydrocarbon radical selected from the class consisting of alkyl, aryl, and aralkyl radicals.

2. The chemical compound trimethylsilylmethyl methylsulfide having the formula (CH$_3$)$_3$Si—CH$_2$—S—CH$_3$ 3. The chemical compound trimethylsilylmethylcyanosulfide having the formula (CH$_3$)$_3$Si—CH$_2$—S—CN 4. The chemical compound bis-(trimethylsilylmethyl) sulfide having the formula (CH$_3$)$_3$SiCH$_2$—S—CH$_2$Si(CH$_3$)$_3$ 5. The chemical compound trimethylsilylmethyl mercaptide having the formula (CH$_3$)$_3$SiCH$_2$SH 6. An organopolysiloxane containing a silicon-bonded —CH$_2$—S—R group where R is a member selected from the class consisting of hydrogen, the —CN radical, alkyl radicals, and the —CH$_2$SiR'$_3$ radical where R' is a monovalent hydrocarbon radical selected from the class consisting of alkyl, aryl, and aralkyl radicals, the remaining valences of silicon in said organopolysiloxane, other than the valences in the siloxane linkages, being satisfied by methyl radicals.

7. The process for preparing chemical compositions corresponding to the general formula R'$_3$Si—CH$_2$—S—R which process comprises reacting a compound having the general formula R'$_3$Si—CH$_2$—X and a compound having the general formula M—SR where M is an alkali metal, X is a halogen, R' is a member selected from the class consisting of alkyl, aryl, and aralkyl radicals, and R is a member selected from the class consisting of hydrogen, the —CN radical, alkyl radicals, and the —CH$_2$SiR'$_3$ radical, and thereafter isolating the desired composition of matter.

References Cited in the file of this patent

UNITED STATES PATENTS

| | | |
|---|---|---|
| 2,474,578 | Gilliam | June 28, 1949 |
| 2,485,603 | Joyce | Oct. 25, 1949 |

OTHER REFERENCES

Whitmore: "Jour. Am. Chem. Soc.," vol. 68 (1946), pages 481–484.

Larsson: "Chalmers Tek. Hag. Handlingar," vol. 79, pages 17–22 (1948).